June 9, 1936. J. BIJUR 2,043,229
CENTRAL LUBRICATION
Original Filed Dec. 27, 1924 2 Sheets-Sheet 1
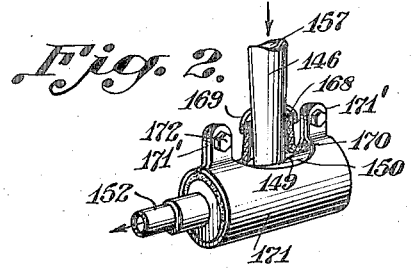
Fig. 2.
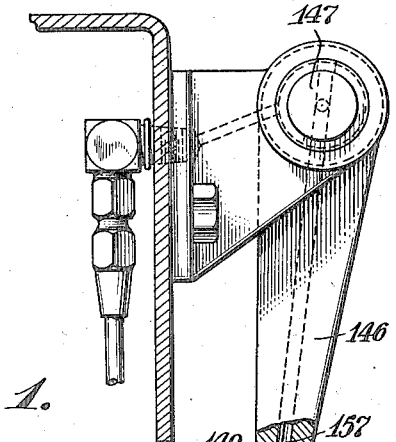
Fig. 1.
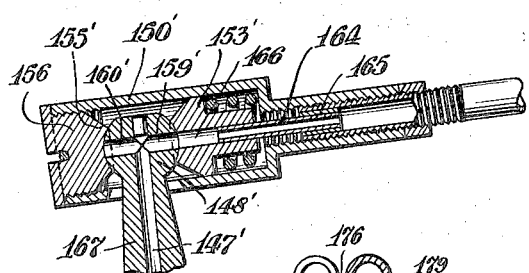
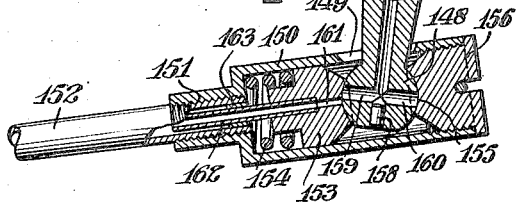
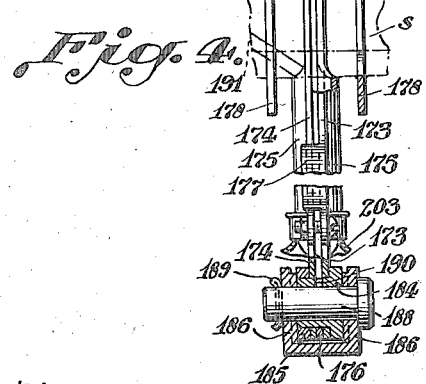
Fig. 4.
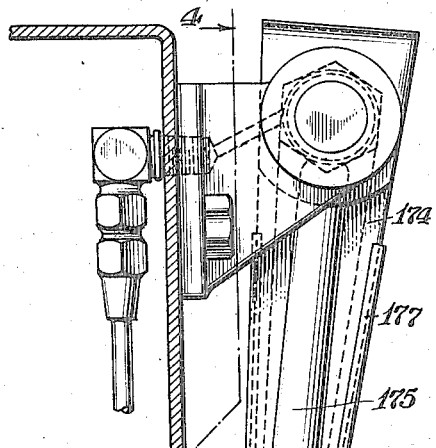
Fig. 3.
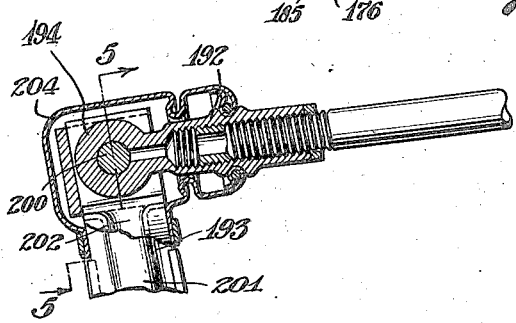
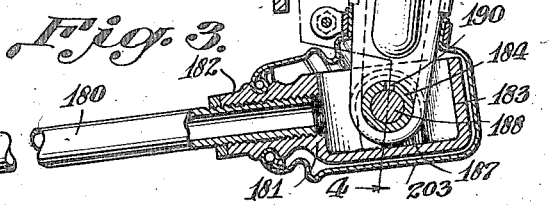
Inventor:
Joseph Bijur, Deceased
by George Bijur, Executor
By
Dean Fairbank Hirsch & Foster
Attorneys June 9, 1936.   J. BIJUR   2,043,229
CENTRAL LUBRICATION
Original Filed Dec. 27, 1924   2 Sheets-Sheet 2
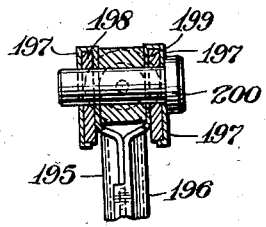
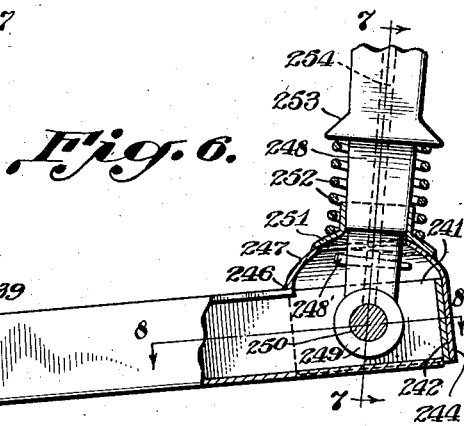
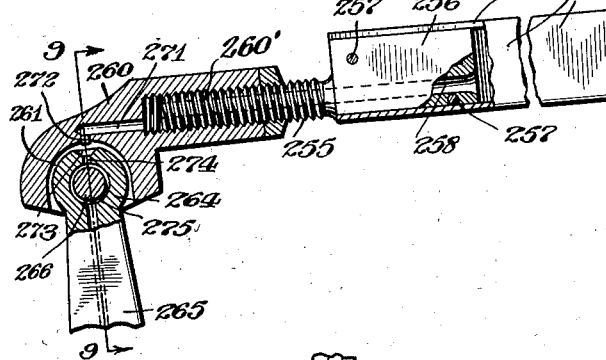
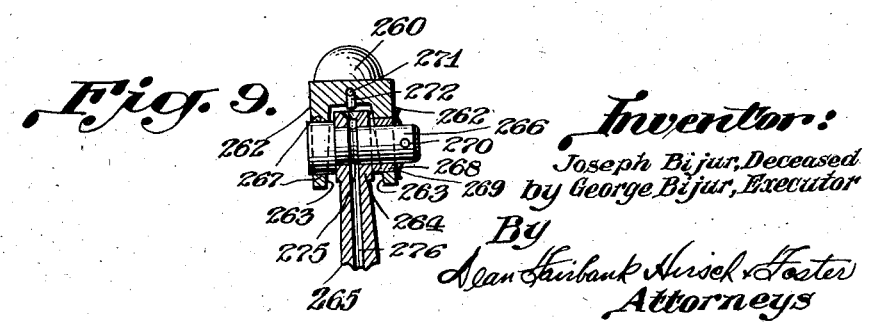
Inventor:
Joseph Bijur, Deceased
by George Bijur, Executor
By
Alan Fairbank Hirsch & Foster
Attorneys Patented June 9, 1936

2,043,229

UNITED STATES PATENT OFFICE 2,043,229

CENTRAL LUBRICATION

Joseph Bijur, deceased, late of New York, N. Y., by George Bijur, executor, New York, N. Y., assignor to Auto Research Corporation, a corporation of Delaware Original application December 27, 1924, Serial No. 758,361. Patent No. 1,888,422, dated November 22, 1932. Divided and this application November 19, 1932, Serial No. 643,322

34 Claims. (Cl. 184—7)

His present invention relates to central lubrication and more especially to the lubrication of some or all of the bearings in the operating mechanical linkages.

It is among the objects of the invention to prevent rattle, to reduce wear and to render more easy the operation of linkages and more especially to provide effective and convenient lubrication for those pivot bearings of linkages such as may be used for operating the brakes of automotive vehicles, which by reason of their large number, their small size and their inaccessibility have not been lubricated heretofore, with any degree of regularity.

The invention in a preferred application is concerned with the lubrication of the linkages referred to, and in one aspect is concerned more especially with the construction and arrangement of conduit, by which the lubricant is passed through the linkage.

His invention has among its objects to provide a serviceable conduit of low cost, which provides the required yield or flexibility where yield should occur, which is not subject to whipping, and which is substantially proof against rupture or leak from vibration of the moving vehicle even in hard usage. His invention provides a conduit in the above relation, the parts of which are not likely to be bent or broken off by the usual impacts encountered in ordinary usage, and which, while accommodating the various relative movements without undue strain at any part of the conduit is, nevertheless, mechanically so strong and is retained securely in place upon the structure.

The desired results are accomplished according to the present invention by extending the lubricant conduit lengthwise of the linkage. The lubricant is advantageously conveyed through the length of the linkage, the various elements of which are bored or made hollow for the purpose desired, so that the lubricant duct is not only protected within the linkage, but, being an integral part thereof, accommodates as does said linkage, the movement of the elements thereof.

Preferably the entire linkage is such that the lubricant conduit is completely enclosed therein and accordingly protected thereby, the various parts being structurally related to inherently establish passages for lubricant in correct non-leaking relationship, and to lubricate the various bearing surfaces in the length of the conduit, all in the absence of any distinct lubricating attachments or connections apart from the mechanical structural assembly.

A familiar type of linkage includes an arm depending from the operating rock shaft to which is pivoted the forward end of a pitman link, the rear end of which is pivoted to a lever on the actuated mechanism. Objects of the invention are to convey the lubricant reliably lengthwise of such linkage, without interfering with the normal operation of the linkage or with the adjustments ordinarily effected in the length of the pitman rod. Other objects are to lubricate with oil passed along the linkage, the various bearings thereof including those at the opposite ends of the pitman link, and without the need for unduly tightening said bearings or making them more bulky or providing protrusions thereon in order to avoid loss or leak of lubricant from the bearings.

According to his invention, the pivot bearing of the pitman link with respect to the arm on the rock shaft, from which it is operated, is in a special terminal fitting at the forward or upper end of the tubular pitman, and the bearing with respect to the lever at the brake is similarly disposed in a special terminal fitting at the lower or rear end of said pitman. Preferably, the lubricant is supplied to the linkage through a fixed inlet associated with the rock shaft whence it drains through a duct longitudinally of the arm thereon to the upper or forward end of the pitman, thence longitudinally through the pitman tube to the lower bearing thereof.

To avoid the loss of lubricant at any of the various joints in the linkage, the pivot pin of each said joint is preferably rigid with the encircling eye or terminal of the linkage element through which the lubricant is fed thereto and affords a duct for the lubricant extending outward to the bearing surface in the eye or terminal pivoted thereon of the succeeding element in the linkage train. Each mechanical element in the train that has a bearing about a pivot pin, preferably has a duct so related to the pin that the lubricant draining from the bearing will naturally pass on into the duct for flow to the bearings, rather than to leak past the ends of the bearing to the road. By this arrangement, although the bearing structure is unenclosed the lubricant at the bearing surface tends to spread outward rather than inward and thus inherently to exclude or wash out any dust or dirt that might otherwise be drawn into the bearing. The relatively rocking elements of the bearing preferably have a telescoping relation, to render more difficult the entry of dust or dirt and in addition a peripheral groove is provided on the inner of the elements adjacent the edge of the outer one, so that dirt or dust will tend to drop therethrough from the bearing rather than to work its way thereinto.

In other embodiments, an exit terminal of each mechanical element in the linkage train extends into the inlet terminal of the next element in the train, said inlet terminal constituting a receptacle in which the bearing is contained, which receptacle drains through a duct in the latter mechanical element to supply other bearings.

In the lubrication of an embodiment of brake in which rock shafts at the brake shield and parallel to the axle transmit the hand and foot braking impulses respectively, through pitmans pivoted to levers mounted on the inner ends of said rock shafts, the lubricant supplied through each of said pitmans is preferably passed onward through the associated lever, to lubricate the bearings therefor.

The invention from another aspect is concerned with the local distribution of lubricant from an inlet at the brake to the various bearings associated therewith and substantially regardless whether said inlet is supplied through the brake operating pitmans or otherwise.

The invention provides convenient means for reliably lubricating all or any number of said bearings without the need for selective manipulations or direct manual access to the individual bearings, and without conduits protruding or projecting, so as to be likely to be torn loose in ordinary use of the vehicle.

Fig. 1 is a fragmentary view partly in section of one form of pitman link transmission, Fig. 2 is a perspective view of one of the terminals and the boot therefor, Fig. 3 is a view similar to Fig. 1 of an alternative construction, Fig. 4 is a sectional view taken along the line 4—4 of Fig. 3, Fig. 5 is a fragmentary sectional view taken along the line 5—5 of Fig. 3, Fig. 6 is a fragmentary detail view of an alternative form of link construction, Fig. 7 is a transverse sectional view taken along the line 7—7 of Fig. 6, Fig. 8 is a longitudinal sectional view taken along the line 8—8 of Fig. 6, and Fig. 9 is a fragmentary sectional view of an alternative form of pitman link terminal.

In Figs. 1 and 2 he has shown an arrangement of pitman rod or tube. The arm 146 which is secured to the rock shaft 147 has a ball construction 148 at its lower end, which extends through a corresponding slot 149 into a generally cylindrical terminal 150 screwed as at 151 upon the follow pitman rod 152. Enclosed within the terminal 150 is a slidable bearing cup 153 urged by a coil spring 154 to press said ball against a complementary cup 155 formed at the inner end of a closure plug 156 threaded and locked into the extremity of the terminal 150. The lubricant is conveyed through a bore 157 longitudinally of the arm 146 plugged as at 158 at its lower end, outward through radial bores 159 and 160 in the ball from which the bearing of said ball is lubricated. The spring 154 effects preferably a tight bearing, so that lubricant will pass from the duct 159 largely into longitudinal duct 161 in the cup 153. A short length of metal pipe 162 rigidly fixed in the rear end of cup 153 conveys the lubricant onward therethrough to drip into the length of the tube 152. To avoid friction and to accommodate the compression and expansion of spring 154 in operation and adjustment, the pipe 162 has a bearing in a bushing 163 at the extreme end of the tube 152. The lubricant passes onward through the length of the tube to a generally similar construction at the opposite end thereof. In the latter construction, however, the pipe 164 is fixed in a bushing 165 in the end of the pitman tube and slides at its opposite end in the longitudinal bore 166 of the bearing cup 153' which bore delivers in part to the ball bearing and in part into radial bore 159' in ball 148'. The construction of terminal 150' is otherwise identical with that described and similar parts bear the same reference numerals primed. Radial duct 159' delivers lubricant to duct 147' in the lever 167, which latter corresponds to a suitable mechanism such as a brake mechanism or an automobile vehicle. Some of the lubricant from bore 159' will, however, pass through bore 160' to lubricate bearing cup 155'. While the spherical or ball bearing construction shown is preferred, it will be understood that the bearings 148 and 148' may be cylindrical rather than spherical.

It is preferred to provide a boot about each of the terminals in Fig. 1 for the purpose of preventing the entry of dust at the substantial opening 149. A preferred embodiment of boot shown in this connection includes a sleeve element 168 of leather about the arm 146 clamped as at 169 and formed in a unit with a generally rectangular blank 170 also of leather partially about the terminal and secured by a complementary sheet metal boot portion 171 at the otherwise uncovered part of the terminal, two pairs of ears 171' of which are clamped together by corresponding bolts 172 to securely grip the terminal.

In Figs. 3, 4 and 5 is shown another embodiment of lubricating linkage, in which the arms and the levers at the respective ends of the pitman link, are metal stampings conformed to provide the lubricant passages, special terminals being provided to accommodate such stamped members. The arm on the rock shaft comprises a pair of stampings 173 and 174, each having a longitudinal outwardly protruding embossment 175, thereby determining a longitudinal oil duct therebetween. In order to provide an outlet at the lower end of the duct 175 and yet afford sufficient metal for an adequate bearing thereat, a metal frame 176 is interposed between said stampings and acts as a spacer therebetween. The two stampings and the spacer are assembled into a unitary construction in any appropriate manner, but preferably by bending tongues 177 integral with one of the stampings about the edge of the other. To afford a secure connection of the composite arm with respect to the rock shaft, so that it rocks as a unit therewith, the individual stampings are provided with reversely bent ends 178 extending outward therefrom, said ends and the main lengths of said links being provided with non-circular, preferably hexagonal eyes 179 corresponding to the similar conformation of the rock shafts.

The pitman 180 formed of a hollow or tubular construction as in other embodiments, has a terminal forging 181 secured in place by a socket 182 threaded over the upper or forward end of said pitman. The terminal includes a generally rectangular box-shaped conformation 183 beyond the tube, sustained in pivoted relation from the eye at the lower end of the composite arm 173—174. Said eye comprises a bushing 184 extending through corresponding openings in the lower ends of the stampings 173 and 174, secured in position by a collar 185 pressed thereon. The bushing 184 fits snugly between the lateral walls 186 of the box-shaped terminal 183, which walls are preferably thickened as at 187, where contacted by the bushing. A pin 188 extending transversely through corresponding eyes in the side walls of the terminal chamber and through the bushing 184 and retained by a cotter pin 189, completes the pivot bearing assembly. A saw kerf 190 transversely of the bushing 184 conveys the lubricant from the longitudinally embossed duct 175 in the composite arm 173, 174 to the bearing surface of the pin 188. The lubricant is admitted to the rock shafts by the oblique duct 191 through the rock shaft delivering into the arm 173—174 through the gap between the polygonal shaft and the upper and open end of embossment 175, whence the lubricant flows downward through said embossment and through the saw kerf 190 to the pin bearing 188, the latter draining into the bottom of receptacle 183 which, in turn, delivers longitudinally downward through the tube 180 to the bearing at the lower end thereof.

The lower end of the pitman link has an adjustable terminal 192. The lever 193 operated from the pitman is of construction generally similar to that shown at the upper end and before described, modified, however, to adapt it for bearing connection with respect to the eye 194 on terminal 192. For this purpose, the upper ends of the individual stampings 195 and 196 are bent to substantially completely encircle as at 197, the sides 198 and 199 of a rigid yoke of U-shape, embracing the flat sides of the eye 194, a pin 200 transversely through the sides 198 and 199 of the yoke and its encircling stamping portions 197 and through the eye 194 completing the bearing assembly. The embossment 201 in the links are open at their upper ends as shown at 202 to drain the lubricant from the eye 194 downward to the bearing or bearings to be supplied therefrom. As shown in the drawings, he prefers to employ dust-excluding boots 203 and 204 at the opposite ends of the pitman link.

In Figs. 6 to 8 is shown an alternative arrangement of the pitman element of a linkage. Instead of the seamless tubular construction previously described, he conforms a sheet metal strip by longitudinally bending into a generally rectangular tube 239. The lateral edges of the strip meet at 240 at the top and may be soldered or welded, if desired, although this is not essential. To form the pivot connection at the upper or forward end of the pitman tube, the upper side thereof is cut away as at 241 and a U shaped yoke 242 is slipped over said end, overlapping the sides 243. A terminal fitting 244 encloses the sides 245 as well as the end of the yoke 242 but is cut away at 246 to straddle the pitman tube and is welded in place at said cut away part. The fitting 244 has an integral neck 247 extending upward from the pitman through which extends the lower end of arm 248 the upper end of which (not shown) is affixed to the rock shaft. The arm 248 has an eye 249 at its lower end fitting snugly between the sides 243 of the pitman tube 239, the assembly being completed by the pivot pin 250 which extends transversely through the terminal fitting 244, the yoke 242 and the sides 243 of the tube 239. Preferably collar 251 encircles the arm 248 directly above the neck 247 and is urged against said neck in dust-excluding relation by a coil spring 252 about the arm and reacting against shoulder 253 integral therewith. A pin 248' through the arm 248 maintains the spring 252 and the collar 251 assembled with respect to the arm 248. Lubricant delivered through longitudinal duct 254 in the arm 248, it will be seen is directly applied to the bearing pin 250 and drops therefrom into the bottom of the terminal, whence it passes onward through the tube to the bearing at the lower end thereof.

At the lower end of the pitman tube, there is preferably a threaded terminal post 255. To attach said post to the rectangular tube, the latter is plugged with a rectangular metal block 256 riveted in place as at 257, the post 255 being formed as an integral extension thereof upon which a suitable terminal socket is adjustably threaded. Preferably, the terminal post extends eccentrically of the block 256, from near the lower face thereof, so that the axial bore 258 through said post and block unit is at a level little above the bottom of the pitman tube to facilitate draining of the latter for effective lubrication of the bearing or bearings which are supplied from the pitman tube.

An alternative embodiment of bearing for the lower or rear end of the pitman tube appears in section at Fig. 9. This construction includes a terminal forging 260, a socket 260' of which is threaded upon the lower end of the pitman link and having a generally cylindrical concavity 261 in its lower side, formed midway between the parallel side walls 262 of the forging. The flat end walls 263 of the concavity diverge downward, as shown. Into the concavity 261 extends the upper or eye end 264 of the operated lever 265, the bearing being completed by a pivot pin 266 having a head extending with a sliding fit in a corresponding eye 267 in one side wall of the forging 260, the shank of said pin extending through a corresponding bushing 268 friction-fitted into the opposite side wall of the forging which bushing protrudes inward. A dished spring washer 269 encircling the end of the pin 266, contacts the forging 260 and reacts against cotter pin 270 through the pivot pin to draw the head of the latter against eye 264 and to urge said eye and bushing 268 into contact. It will be apparent that rattle is thus avoided, the wear between the thrust surfaces for eye 264 being automatically compensated for by the expansion of spring 269. The lubricant is conveyed from the pitman tube by a bore 271 from near the lower part of the socket 260', said bore connected through a short vertical tube 272 to deliver into a well or depression 273 in the upper end of the eye 264 which well in turn drains through a bore 274 in the eye to the bearing of the pivot pin. The pivot pin preferably has a peripheral groove 275 thereabout which delivers oil, in part, to lubricate the bearing surface of the pivot pin and in part to duct 276 lengthwise of the lever 265 to supply other bearing surfaces.

The present application is a division of application Serial No. 758,361, filed December 27, 1924, which matured as Patent No. 1,888,422, on November 22, 1932.

The lubricating installations of the present applications may be utilized to lubricate other chassis bearings than the ones associated with the brake operating mechanisms, and the lubricating installation may also be utilized to lubricate bearings other than those utilized on or in association with automobile chassis, or other vehicles. The lubricating installations disclosed are broadly applicable to mechanisms involving linkages or operating connections.

By the expression "pitman" utilized in the specification accompanying the claims are included an elongated rigid element, such as indicated at 152 in Fig. 1, 180 in Fig. 3, and 239 in Fig. 6 which transmits motion or power between two reciprocating elements. For example the lever elements 146 of Fig. 1, 174 of Fig. 3 and 253 of Fig. 6 respectively transmit movement to these pitman elements. These pitman elements are provided with lubricant passages extending therealong, and in the preferred form the lubricant passageway is formed within the pitman element by causing such pitman element to have a tubular construction, as shown in Figs. 1, 3 and 6. The expression tube and tubular element in the accompanying claims includes the constructions of Figs. 1, 3 and 6.

By the expression "ferrule" utilized in the specification and the accompanying claims is meant a casing element which may take the form of a receptacle, such as a cup or a sleeve. A cylindrical or sleeve type ferrule is shown in Fig. 1, while other embodiments show other type and constructions of ferrules. In these ferrules or receptacles are usually located the bearings connected between the pitman or the actuated lever which is to be lubricated.

What is claimed is:—

1. In a lubricated mechanism of the type having a control, an operated mechanism and an operating linkage train between said control and said operated mechanism, said linkage train having bearings to be lubricated, in combination, a pair of mechanical elements in the linkage train, including an operating arm and an operated pitman link, said link being tubular and having a terminal receptacle fixed thereon, housing the corresponding end of said arm, means maintaining said pitman link assembled to said arm and constituting a bearing for the end of said arm, a duct lengthwise of said arm supplying said bearing, said receptacle draining to the tubular length of the pitman.

2. In a lubricated mechanism of the type having a control, an operated mechanism and an operating linkage train between said control and said operated mechanism, said linkage train having bearings to be lubricated, in combination, a member near the control, a member substantially at the mechanism to be operated and a longitudinally extending pitman link connecting said members, said link having a ferrule at one end, substantially enclosing the end of the corresponding member, and cups within said ferrule, spring-urged together and having rounded surfaces gripping the correspondingly rounded end of said member, said member being provided with a longitudinal lubricant passageway extending the length thereof, the enclosed end of said member being provided with a plurality of bores communicating with said passageway, one of said cups being provided with a bore communicating with said bores in said end of said member, and said pitman link being also provided with a lubricant passageway communicating with said cup bore, whereby lubricant may pass from said member to said pitman link.

3. In a lubricated mechanism of the type having a control, an operated mechanism and an operating linkage train between said control and said operated mechanism, said linkage train having bearings to be lubricated, in combination, an arm near the control, a lever substantially at the operated mechanism and a longitudinally extending tubular pitman link connecting said arm and said lever, said link having a ferrule at each end, each substantially enclosing the end of the corresponding arm or lever, and cups within said ferrules, spring-urged together and having rounded surfaces gripping the correspondingly rounded end of said arm or lever, to constitute bearings therefor, a duct delivering through the rounded end thereof, to lubricate the corresponding bearing and draining through a duct in the inner of the cups at the forward end of the tubular rod and lengthwise therethrough to the bearing at the opposite end thereof.

4. The combination set forth in claim 3 in which the lever at the delivery end of the pitman drains lubricant therefrom to the pivot mount of said lever.

5. In a lubricated mechanism of the type having a control, an operated mechanism and an operating linkage train between said control and said operated mechanism, said linkage train having bearings to be lubricated, in combination, a cross shaft, an arm thereon having a rounded end, a tubular pitman, a ferrule fixed upon the forward end thereof, said ferrule having rounded cups spring-pressed to grip said rounded end in bearing relation, a ferrule at the rear end of said pitman having rounded cups therein, a lever mounted at the operated mechanism and having a rounded end extending into said latter ferrule and spring-pressed between said latter cups, means supplying lubricant to said bearings at the ends of said pitman, said means comprising a duct through said arm and through the rounded end thereof to lubricate the bearing in said forward ferrule and draining through a longitudinal bore in the inner of the associated cups to the pitman, an outlet pipe at the rear end of said pitman telescoped into a corresponding longitudinal bore in the inner of the cups on the rear ferrule, said latter bore delivering to the bearing in the rear ferrule.

6. In a lubricated mechanism of the type having a control, an operated mechanism and an operating linkage train between said control and said operated mechanism, said linkage train having bearings to be lubricated, in combination, a pitman having a pivot mount at one end with respect to an operating arm and a pivot mount at the other end with respect to an operated lever, said pitman comprising a rod, ferrules at the opposite ends of said rod, each having a fixed cup therein at the extreme end thereof, and a second cup spring-pressed toward said fixed rounded cup for gripping the rounded end of the associated arm or lever therebetween, said spring-pressed cups having longitudinal bores therethrough, and pipes telescoped thereinto, each extending part way into the rod, said rod having a bore the length thereof.

7. The combination set forth in claim 6 in which the pipe at the forward end of the rod is fixed in the corresponding cup and has a sliding relation with respect to a bushing in the end of the rod, and the pipe at the rear end is fixed with respect to the rod and has a sliding fit in the corresponding cup.

8. In a linkage, in combination, a lever member, a pitman link, said pitman link having a ferrule at an end thereof, cups within said ferrule, said lever member having a rounded end extending into said ferrule between said cups, a spring pressing said cups together into bearing relation with said rounded end and a dust-excluding boot including a shank over a part of the lever, a cover member unitary therewith extending about said ferrule, and a complementary element overlapping the edges of said cover member extending about the cover members, and gripping the ferrule to maintain in position the parts of the dust excluding boot, said member being provided with a longitudinal lubricant passageway extending the length thereof, the enclosed end of said member being provided with a plurality of bores communicating with said passageway, one of said cups being provided with a bore communicating with said bores in said end of said member, and said pitman link being also provided with a lubricant passageway communicating with said cup bore, whereby lubricant may pass from said member to said pitman link.

9. In a lubricated mechanism of the type having a control, an operated mechanism and an operating linkage train between said control and said operated mechanism, said linkage train having bearings to be lubricated, in combination, a lever, a pitman element pivoted thereto at one end, a second lever to which the opposite end of said pitman is pivoted, said first pivot connection comprising a receptacle fixed onto the end of said pitman, said lever extending into said receptacle snugly between the sides thereof and a pin transversely through said receptacle and through said lever end to form the bearing therefor, said pitman constituting a tube draining lubricant from said receptacle to said second lever.

10. The combination set forth in claim 9 in which a dust excluding boot encloses the receptacle and has a neck encircling the lever.

11. In a lubricated mechanism of the type having a control, an operated mechanism and an operating linkage train between said control and said operated mechanism, said linkage train having bearings to be lubricated, in combination, a pitman, a lever operated thereby, said lever having a pivot connection with respect to said pitman, said connection comprising a channel formed member on the lever, an eye on the end of the pitman straddled by said channel conformation, a pin transversely through said channel and said eye and a bearing mount therefor, said pitman constituting a tube for conveying lubricant to said eye, said lever including a conduit draining from the bottom of said channel to the bearing mount.

12. The combination set forth in claim 11 in which the eye has a shank threaded over the end of the pitman and a dust excluding boot is anchored in a corresponding groove in said shank and extends over said pivot connection and has a neck encircling said lever.

13. In a lubricated mechanism of the type having a control, an operated mechanism and an operating linkage train between said control and said operated mechanism, said linkage train having bearings to be lubricated, in combination, a pitman link including a tube, a bearing fitting at one end thereof threaded onto the end of said tube and constituting a rectangular receptacle therebeyond for housing the end of an operating arm therefor, and a bearing construction at one end of said pitman comprising a ferrule adjustably threaded over said end and having an integral eye beyond said end, and a duct therethrough leading to said eye.

14. In a lubricated mechanism of the type having a control, an operated mechanism and an operating linkage train between said control and said operated mechanism, said linkage train having bearings to be lubricated, in combination, a shaft, an arm rigid therewith, depending therefrom and having a duct therethrough, a pitman operated from said arm, said pitman including a tube, a rectangular receptacle fitted on the end thereof and lodging the end of said arm, a pin transversely through said receptacle and said end to constitute the bearing therefor, a ferrule on the opposite end of said rod having an eye therein, a lever operated by said ferrule and having a lever bearing with respect to said eye, said lever including a channel formation straddling said eye and a pin through said eye and said channel formation to constitute a bearing therefor and a draining connection from said bearing longitudinally of said lever to supply the lever bearing.

15. In a linkage, in combination, a composite oil conveying lever comprising a pair of stamped metal members, each provided with a non-circular eye conformation, at one end for keying onto an operating shaft, and having a hollow conformation therebetween to convey lubricant longitudinally thereof, to an eye conformation at the other end thereof, and a bearing at said latter eye conformation.

16. In a linkage, in combination, a pair of superposed sheet metal members affixed to each other and having a longitudinal embossment therebetween to constitute an oil duct, said stampings being provided with eyes at each end thereof, one of said eyes constituting a keying connection with respect to a shaft through which lubricant is supplied to the embossment, the other of said eyes having a bearing associated therewith supplied with lubricant transmitted longitudinally of said embossment.

17. In a linkage, in combination, a lever comprising a pair of metal stampings affixed in superposed relation and having longitudinal embossments therein to constitute an oil duct longitudinally thereof, a spacer frame between said stampings to prevent escape of lubricant laterally and to afford an outlet to the bearing at the end of the embossment.

18. In a linkage, in combination, a rock shaft having a non-circular part, a lever rotatable therewith, said lever comprising a pair of stampings connected in superposed relationship, each having a reversely bent end with a corresponding opening fitted over said non-circular shaft, each of said levers being embossed outwardly below said shaft to constitute a passage for lubricant supplied therebetween through a duct in said shaft, and a bearing mounted at the lower end of said lever and supplied with lubricant delivered through said embossment.

19. In a linkage, in combination, a composite lubricant conveying lever comprising a pair of stamped elements in superposed relationship secured together, said stampings having embossments longitudinally thereof to constitute an oil duct and having eyes at the lower ends thereof, said stampings being spaced apart at said lower ends to constitute a bearing support, a bearing bushing fixed in said eyes, a coacting bearing member straddling said bushing and a pin through said straddling member and said bushing to maintain the bearing assembly.

20. In a linkage, in combination, a composite lever comprising a pair of metal stampings in superposed relationship, a spacing frame interposed between said stampings, said stampings having interlocking lateral tongues, longitudinal embossments determining an oil passage, a bearing eye at one end of said assembly, said embossments terminating adjacent said eye and delivering lubricant thereto through the interposed space, and means for admitting lubricant at the opposite end of said embossments.

21. The combination set forth in claim 20 in which the lever is mounted on a non-circular shaft, by a reversely bent U-shaped construction on each of the stampings, through which reversely bent portions and the interposed main length of the stamping the non-circular shaft extends for secure keying connection.

22. In a linkage, in combination, a composite lever comprising a pair of stamped metal members associated together, a U-member, the ends of said stampings being reversely bent, each to embrace one of the legs of the U-member, said U-member constituting a bearing support for said lever.

23. In a linkage, in combination, a composite lever comprising a pair of stamped metal members associated together, a U-member, the ends of said stampings being reversely bent, each to embrace the adjacent leg of the U-member, an eye member straddled by said U-member, and a bearing pin extending transversely through said U-member and said eye.

24. In a linkage, in combination, a pivot connection between the ends of a pitman link and a lever, said connection comprising a substantially vertical inverted socket on the link, a lever eye therein, the base of the socket being above the eye, a pivot pin lodged in said socket and through said eye to constitute a bearing therefor, and a lubricant inlet to said socket extending through the base thereof and delivering to a depression in the upper part of said eye draining through a bore to the pivot pin.

25. In a linkage, in combination, a pitman link comprising an oil conveying tube, a terminal thereon, said terminal including a downwardly extending generally cylindrical trough, a lever having an eye at its upper end extending into said trough, a pivot pin extending through the side walls of said trough, and through said eye to constitute a bearing therefor, a lubricant inlet through said terminal delivering directly above said eye, said eye having a well intercepting the drip from said inlet and draining through a bore to the bearing surface of the pivot pin.

26. The combination set forth in claim 25 in which the pivot pin has a peripheral groove and drains to a longitudinal duct in said lever for supplying lubricant to an associated bearing.

27. In a linkage, in combination, a pitman comprising a tube, a terminal thereon, having a generally rectangular block provided with a concavity in the lower surface thereof, a lever having an eye extending into said concavity, a pivot pin having a head in one side of said block, a shank constituting a bearing for said lever eye and extending through the other side of said block, a bushing encircling said pin and fitting in the latter side of the block, a cotter pin through said pin, and a spring interposed between said cotter pin and said block to draw together the head of said pin, said eye and said bushing, said pitman, said terminal, said lever, said eye and said pin all being provided with intercommunicating lubricant passageways.

28. In a linkage, in combination, an arm, a pitman operated therefrom, said pitman having a generally rectangular trough conformation at its end, a metallic boot construction closing the end of said pitman and straddling the sides and having a neck encircling said arm, said arm having an eye at its lower end and a pivot pin through the sides of said trough and said eye, said arm, and said eye all being provided with intercommunicating lubricant passageways.

29. The combination set forth in claim 28 in which a longitudinal duct through said arm delivers to said pin and said pin drains excess lubricant to and along said trough to lubricate other bearings.

30. In a linkage, in combination, a pitman comprising a blank of metal bent into a closed generally rectangular tube, the upper side of said tube cut-away at one end, a U-shaped yoke straddling the sides of said tube and closing the end thereof, a metallic boot extending over the sides and end of said yoke and having a neck above said tube, an operating arm for said pitman encircled by said neck and extending through the open end of the top of said tube and having an eye at its lower end and a pivot pin lodged in the sides of said boot, said yoke and said tube and extending through said eye.

31. In a linkage, in combination, a pitman comprising a unitary generally rectangular tube of unitary sheet metal, a metal block filling one end of said tube and riveted in place therein, and having a threaded shank extending therebeyond and a terminal socket for said pitman adjustably threaded upon said shank, said shank having an axial bore therethrough to deliver lubricant to the terminal socket from the length of said tube.

32. The combination set forth in claim 31 in which the shank is eccentric with respect to the tube and near the bottom thereof for facility in draining the lubricant thereto from the length of the tube.

33. In a motor vehicle of the type having a chassis frame, wheels provided with brake mechanisms upon which wheels, said frame is supported, and a brake control carried by said chassis frame; a linkage enabling operation of said mechanism by said control including a vertically depending lever member pivotally connected at its upper end to the chassis frame and provided with an internal lubricant passageway extending substantially along the axis of said lever from end to end thereof, said lever being provided at its lower end with a lever bearing element; a substantially horizontal elongated pitman member, slightly sloping downwardly, of hollow construction having a receptacle at its upper end to receive said lever bearing element, said receptacle also being provided with cup means to embrace and enclose said lever bearing element, and with means to form a bearing for said lever bearing element, said lubricant being fed to said bearing by said lever lubricant passageway, and the excess of lubricant overflowing into said cup means, and then flowing from said cup means into the interior of said hollow pitman; the lower end of said pitman being provided with a lower pitman bearing element and with a receptacle receiving lubricant from the hollow interior of the pitman, said second receptacle receiving lubricant from said hollow interior of said pitman and being fed through a bore in the end of said pitman leading to said lower pitman bearing element; and a second lever extending downwardly toward the brake mechanism and at its upper end having a bearing element cooperating with said lower pitman bearing element, said upper end being enclosed in said receptacle and said second lever being provided with a longitudinally extending lubricant passageway fed from said hollow pitman through said bearing between said lower pitman bearing element and said second lever bearing element.

34. In a linkage, in combination, a composite lever comprising a pair of stamped metal members associated together, a U member, the ends of said stampings being reversely bent, each to embrace the adjacent leg of the U member, an eye member straddled by said U member, and a bearing pin extending transversely through said U member and said eye, the composite lever having a longitudinal duct embossed therein feeding lubricant to said bearing pin.

GEORGE BIJUR,
*Executor of the Estate of Joseph Bijur, Deceased.*